United States Patent [19]

Takada et al.

[11] Patent Number: 5,436,854
[45] Date of Patent: Jul. 25, 1995

[54] MICROCOMPUTER-CONTROLLED ELECTRONIC DEVICE

[75] Inventors: Shinji Takada, Kanagawa; Kenji Kobayashi, Chiba, both of Japan

[73] Assignee: Sony Corporation, Tokyo, Japan

[21] Appl. No.: 341,263

[22] Filed: Nov. 17, 1994

Related U.S. Application Data

[63] Continuation of Ser. No. 959,978, Oct. 13, 1992, abandoned.

[30] Foreign Application Priority Data

Oct. 18, 1991 [JP] Japan .................. 3-271125

[51] Int. Cl.$^6$ .................................. G12B 13/00
[52] U.S. Cl. .................. 364/571.01; 364/159; 364/192; 364/193; 364/579; 395/89; 324/527; 348/718; 371/16.1; 371/16.4
[58] Field of Search ............... 395/89; 364/159, 192, 364/193, 579, 571.01; 324/527; 358/327; 348/718; 371/16.1, 16.4

[56] References Cited

U.S. PATENT DOCUMENTS

| | | | |
|---|---|---|---|
| 4,162,531 | 7/1979 | Rode et al. | 364/579 |
| 4,297,527 | 10/1981 | Pate | 381/107 |
| 4,300,196 | 11/1981 | Lopresti | 364/579 |
| 4,538,268 | 8/1985 | Pham Van Cang | 364/579 |
| 4,607,214 | 8/1986 | Welzhofer | 364/579 |
| 4,926,363 | 5/1990 | Nix | 364/579 |
| 5,033,015 | 7/1991 | Zwirn | 364/579 |
| 5,115,407 | 5/1992 | Bird et al. | 364/579 |
| 5,220,499 | 6/1993 | Kawamori | 364/579 |
| 5,220,519 | 6/1993 | Eller | 364/579 |

*Primary Examiner*—Ellis B. Ramirez
*Assistant Examiner*—Thomas Peeso
*Attorney, Agent, or Firm*—Jay H. Maioli

[57] ABSTRACT

A microcomputer-controlled electronic device such as a video camera has a signal processor for processing an input signal supplied thereto. The signal processor is controlled by a system controller comprising a microcomputer. The system controller supplies a test signal, read from a memory, to the signal processor, and receives a processed test signal from the signal processor. The system controller also assesses the processed test signal from the signal processor for adjustment of the signal processor based on a command from an adjusting device connected to the video camera, while at the same time controlling operation of the signal processor.

4 Claims, 2 Drawing Sheets

MICROCOMPUTER-CONTROLLED ELECTRONIC DEVICE

This is a continuation of application Ser. No. 07/959,978 filed Oct. 13, 1992 now abandoned.

BACKGROUND OF THE INVENTION

1. Field of the Invention

The present invention relates to a microcomputer-controlled electronic device for use as any of various video systems such as a video camera or a video tape recorder, for example.

2. Description of the Prior Art

Microcomputer-controlled electronic devices such as a video camera, a videotape recorder, or the like are often required to be adjusted when manufactured or repaired. For such adjustments, control data is supplied from an external source to the microcomputer of a microcomputer-controlled electronic device.

FIG. 1 of the accompanying drawings shows one conventional microcomputer-controlled electronic device 1 such as a video camera. The microcomputer-controlled electronic device 1 has a system controller 2 in the form of a microcomputer for controlling various circuits in the microcomputer-controlled electronic device 1. To the system controller 2, there is connected a digital-to-analog converter 3 which converts digital control data supplied from the system controller 2 into analog control data. The analog control data is supplied to a plurality of signal processors 4 (only one shown in FIG. 1) in the microcomputer-controlled electronic device 1. Each of the signal processors 4 comprises an integrated circuit (IC) for processing a signal supplied from a preceding circuit (not shown) through an input terminal 4a and supplying a processed signal to a next circuit (not shown) through an output terminal 4b.

Each of the signal processors 4 has a variable unit such as an electronic volume control unit. The variable unit has its parameter whose setting can be selected by the control data supplied from the system controller 2 through the digital-to-analog converter 3. Therefore, the settings of the variable units of the signal processors 4 can be varied by the system controller 2.

To adjust the microcomputer-controlled electronic device 1 from outside, an adjusting device 5 is connected to the electronic device 1 as shown in FIG. 1. Adjusting data is then supplied from the adjusting device 5 to the system controller 2 through an adjusting data input terminal 1a of the electronic device 1. The adjusting data supplied to the system controller 2 varies the control data produced by the system controller 2, thus adjusting the settings of the variable units of the signal processors 4 to desired values. To confirm the signal processing condition in the signal processors 4, a test signal is supplied from the adjusting device 5 through an input terminal 1b to each of signal input terminals of the signal processors 4. Test signals processed by the signal processors 4 are then sent through a terminal 1c back to the adjusting device 5. Therefore, the adjusting device 5 can confirm whether the settings of the variable units of the signal processors 4 are acceptable or not, based on the processed test signals fed back to the adjusting device 5.

The terminals 1a, 1b, 1c of the electronic device 1 allow the electronic device 1 to be adjusted under remote control from the adjusting device 5 without opening the electronic device 1 to expose its internal structure, and therefore are very convenient for adjustments to be made when the electronic device 5 is manufactured or repaired. However, the terminals 1b, 1c connected to the input and output terminals of the signal processors 4 necessarily make the electronic device 5 complex in structure.

In the case where the electronic device 5 comprises a video system or the like which handles high-frequency signals and analog signals, the test signal tends to be affected by the length and material of signal wires by which the adjusting device 5 and the signal processors 4 are connected. For this reason, good care should be taken in selecting the signal wires for a proper assessment of the adjustments that have been made. It has therefore been difficult to adjust the electronic device 1 to an optimum condition with simple connections to and in the electronic device 1.

OBJECTS AND SUMMARY OF THE INVENTION

It is therefore an object of the present invention to provide a microcomputer-controlled electronic device that can be well adjusted from an external adjusting device with a simple arrangement.

According to the present invention, there is provided an electronic device comprising a processing circuit for processing an input signal supplied thereto, and a microcomputer for controlling operation of the processing circuit, for supplying a test signal to the processing circuit and receiving a processed test signal from the processing circuit, and for assessing the processed test signal from the processing circuit for adjustment of the processing circuit while controlling operation of the processing circuit.

The electronic device further includes a memory for storing test signal data and supplying the test signal from the stored test signal data to the microcomputer, a first digital-to-analog converter for converting the test signal into an analog test signal and supplying the analog test signal to the processing circuit, and a second digital-to-analog converter for converting the processed test signal into a digital processed test signal and supplying the digital processed test signal to the microcomputer.

The microcomputer can assess the processed test signal when the processing circuit is adjusted by a command supplied from an adjusting device connected to the electronic device. Therefore, the processing circuit can well be adjusted simply by monitoring the assessment data from the microcomputer.

The above and other objects, features, and advantages of the present invention will become apparent from the following description of an illustrative embodiment thereof to be read in conjunction with the accompanying drawings, in which like reference numerals represent the same or similar objects.

DETAILED DESCRIPTION OF THE PREFERRED EMBODIMENT

Figure 1:
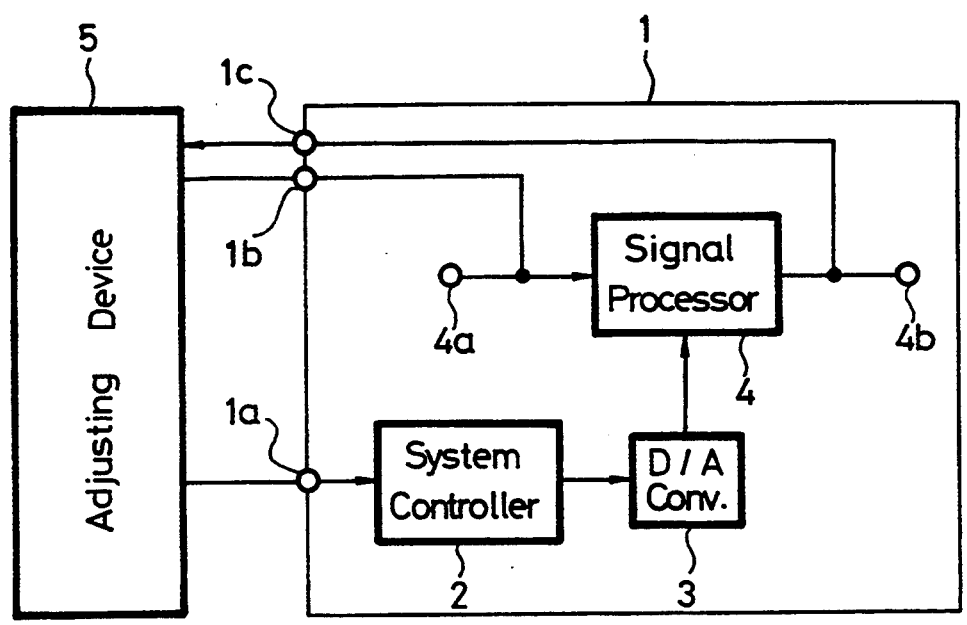
FIG. 1 is a block diagram of a conventional microcomputer-controlled electronic device.
Figure 2:
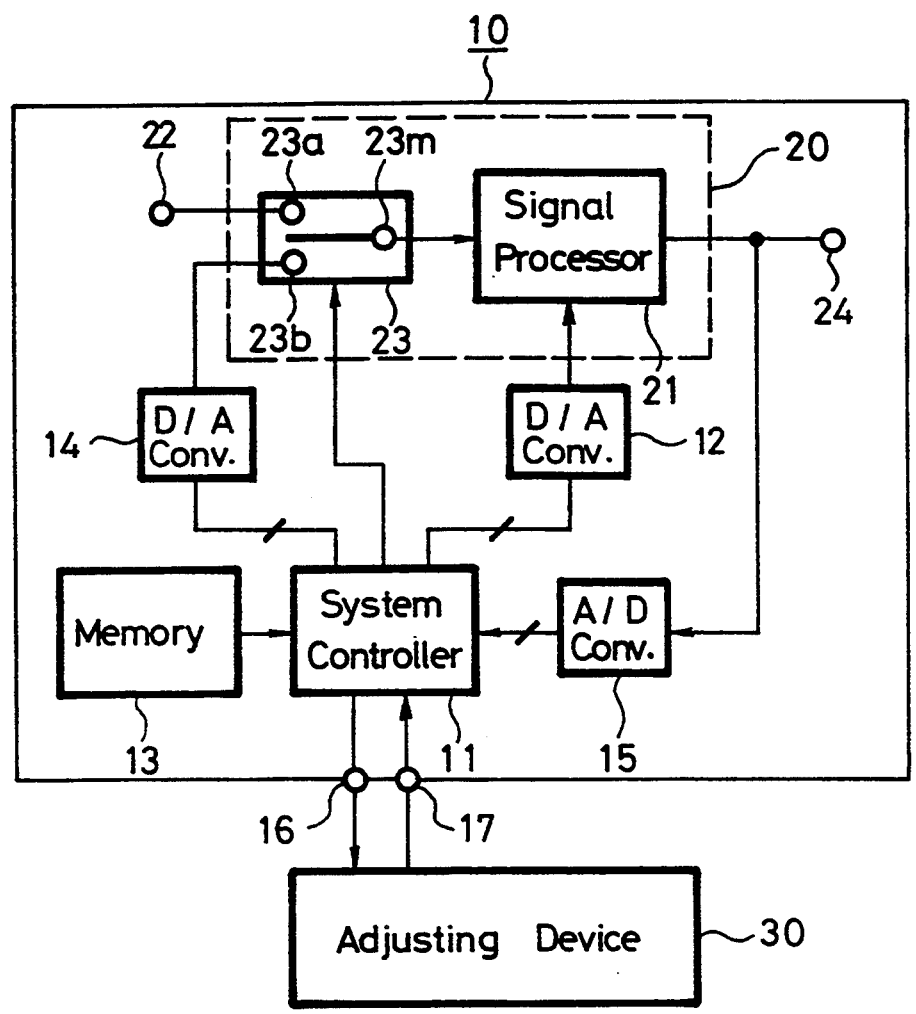
FIG. 2 is a block diagram of a microcomputer-controlled electronic device according to the present invention.

The principles of the present invention are incorporated in a microcomputer-controlled electronic device which is in the form of a video camera in an illustrated embodiment shown in FIG. 2.

As shown in FIG. 2, a video camera 10 has a system controller 11 comprising a microcomputer for controlling operation of various circuits in the video camera 10.

The system controller 11 can send commands (control data) to various circuit blocks in the video camera 10. Some circuit blocks require control data to be supplied as analog control data. For example, the video camera 10 includes a circuit block 20 having an analog signal processor 21 that comprises a variable unit whose parameter is set by the level of a supplied signal. The control data supplied from the system controller 11 is converted into an analog signal by a digital-to-analog converter 12, and the analog signal is supplied to the signal processor 21 to provide a given parameter setting for the variable unit of the signal processor 21. Although not shown, the video camera 10 has other circuit blocks including respective signal processors that comprise variable units whose parameters can directly be adjusted by digital control data. Such circuit blocks are supplied directly with digital control data from the system controller 11.

The circuit block 20 also has a selector switch 23 having two fixed contacts 23a, 23b and a movable contact 23m. The selector switch 23 is controlled by the system controller 11 to connect the movable contact 23m to either the fixed contact 23a or 23b. The circuit block 20 operates as follows: A preceding circuit (not shown) in the video camera 10 supplies a signal through an input terminal 22 to the fixed contact 23a of the selector switch 23 in the circuit block 20. The signal processor 21 is supplied with a signal from the movable contact 23m of the selector switch 23. In normal modes of operation of the video camera 10, the system controller 11 keeps the movable contact 23m in contact with the fixed contact 23a, so that the signal from the preceding circuit is supplied through the selector switch 23 to the signal processor 21. The signal processor 21 processes the supplied signal, and supplies a processed signal through an output terminal 24 to a next circuit (not shown) in the video camera 10.

To make adjustments of the video camera 10, the system controller 11 supplies a test signal to the signal processor 21. More specifically, a memory 13 for storing digital test signal data is connected to the system controller 11. The system controller 11 reads a test signal in the form of digital data from the memory 13 and supplies the test signal to a digital-to-analog converter 14. The digital-to-analog converter 14 converts the digital test signal into an analog test signal and applies the analog test signal to the fixed contact 23b of the selector switch 23. When the test signal from the memory 13 is delivered through the system controller 11 and the digital-to-analog converter 14 to the selector switch 23, the system controller 11 controls the selector switch 23 to shift the movable contact 23m to the fixed contact 23b, so that the test signal from the digital-to-analog converter 14 is supplied to the signal processor 21 through the selector switch 23.

If the circuit block 20 is a circuit for processing a chrominance signal of a video signal, for example, then the system controller 11 reads a test signal, e.g., a color signal for displaying a monochromatic image of red, from the memory 13, and supplies the test signal through the digital-to-analog converter 14 and the selector switch 23 to the signal processor 21.

The system controller 11 is capable of determining a state, i.e., a level, of the test signal which has been processed by the signal processor 21. Specifically, the processed signal delivered from the signal processor 21 to the output terminal 24 is supplied to an analog-to-digital converter 15, which converts the supplied signal into digital data according to the level of the processed signal. The digital data is then sent from the analog-to-digital converter 15 to the system controller 11.

Therefore, the system controller 11 can supply a test signal to the signal processor 21 and also assess the processed test signal from the signal processor 21. As a result, the system controller 11 can determine whether the adjusted condition of the signal processor 21, i.e., the condition of the control data supplied through the digital-to-analog converter 12 to the signal processor 21, is acceptable or not. If the circuit block 20 is a chrominance signal processing circuit by way of example, as described above, then the system controller 11 assesses the level of a color test signal that has been processed by the signal processor 21 to determine whether the signal processor 21 can process chrominance signals well or not.

Various control devices can be connected to the video camera 10. The video camera 10 has an output terminal 16 for outputting data from the system controller 11 to such a control device and an input terminal 17 for supplying data from the control device to the system controller 11. For instance, an editing device may be connected to the terminals 16, 17 for an exchange of data between the editing device and the system controller 11. When a remote control code is supplied from the editing device to the system controller 11, the video camera 10 can be remotely controlled for recording and playback modes, for example, by the editing device. The system controller 11 can transmit data indicating operating conditions of the video camera 10 to the editing device, which now can confirm the operating conditions of the video camera 10. One example of such data transmitted from the system controller 11 is count data of a counter which measures the length of a video tape that has been transported in the video camera 10. The remote controllability of the video camera 10 using the editing device facilitates various editing processes such as a dubbing process to be performed between a plurality of video cameras or video tape recorders connected to the editing device.

In the illustrated embodiment, an adjusting device 30 for making adjustments in the video camera 10 can be connected to the video camera 10 through the terminals 16, 17. When the adjusting device 30 is thus connected to the video camera 10 as shown in FIG. 2, commands produced by the adjusting device 30 are sent through the input terminal 17 to the system controller 11, and data indicative of operating conditions of the video camera 10 is supplied from the system controller 11 through the output terminal 16 to the adjusting device 30.

Since the adjusting device 30 and the system controller 11 can be connected to each other for two-way data communication therebetween, it is possible for the adjusting device 30 to adjust the circuits in the video camera 10. For example, to adjust the circuit block 20 in the video camera 10, the adjusting device 30 sends the system controller 11 a command for adjusting the variable unit of the signal processor 21 while supplying a test signal to the circuit block 20. The system controller 11 assesses the condition of the processed test signal sent back from the circuit block 20, and transmits the assessment data to the adjusting device 30. When the operator who is monitoring the circuit block adjustment at the adjusting device 30 decides that the circuit block 20 is well adjusted, the operator stops sending the command from the adjusting device 30 to the system controller 11.

Because the circuits in the video camera 10 can be adjusted under remote control from the adjusting device 30, they can easily be adjusted when the video camera 10 is manufactured or repaired, simply by connecting the adjusting device 30 to the terminals 16, 17 without opening the video camera 10 to expose its internal structure. The terminals 16, 17 are originally provided for use in various modes of operation of the video camera 10 during an editing process or the like, but not dedicated to adjustments in the video camera 10. The video camera 10 is therefore relatively simple in structure as it does not need any extra terminals which would otherwise be dedicated to connection to the adjusting device 30. The memory 13 for storing digital test signal data may be provided by an empty area in a memory connected to the system controller 11 for storing a program which controls operation of the video camera 10. Therefore, no dedicated separate memory is necessary for storing digital test signal data, and a circuit arrangement for generating test signals is highly simple. Since the processed test signal is assessed by the system controller 11, the processed test signal does not need to be transmitted to the adjusting device 30. It is thus highly unlikely for adjustments made to the video camera 10 to be affected or varied by the length and material of signal wires which connect the adjusting device 30 to the video camera 10. Accordingly, the video camera 10 can be well adjusted at all times.

A common communication procedure or protocol may be employed for data communication between the video camera 10 and an editing device connected thereto through the terminals 16, 17, and data communication between the video camera 10 and the editing device 30 connected thereto through the terminals 16, 17. According to the common communication procedure, a category code is added to a leading end of one unit of data to enable the system controller 11 to identify a device which it communicates with. In this manner, the system controller 11 may have a common communication interface that can be shared for communication with the editing and adjusting devices.

In the above embodiment, the analog signal processor in the video camera 10 is adjusted by way of example. However, any circuits for processing digital data in microcomputer-controlled electronic devices may also be adjusted. Since digital data processing circuits may be directly supplied with digital control data from the system controller, digital-to-analog converters and analog-to-digital converters are unnecessary for the conversion of the digital control data.

While the present invention has been shown and described as being applied to a video camera, the principles of the present invention are also applicable to video devices such as a video tape recorder or other electronic devices having a microcomputer.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. An electronic device comprising:
    a processing circuit for processing a signal supplied thereto;
    external adjusting means for supplying a command signal to adjust said processing circuit;
    a microcomputer for controlling operation of said processing circuit, and for supplying a test signal to said processing circuit, receiving a processed test signal from said processing circuit, assessing said processed test signal from said processing circuit and adjusting said processing circuit according to the assessment in response to said command signal supplied by said external adjusting means;
    means for supplying said processed test signal to said microcomputer; and
    a switch for receiving said test signal and said input signal at respective inputs and selectively supplying one of said test signal and said input signal to said processing circuit in response to a control signal received from said microcomputer.

2. The electronic device according to claim 1, further including a memory for storing test signal data and supplying said test signal from the stored test signal data to said microcomputer.

3. The electronic device according to claim 1, wherein said means for supplying said processed test signal to said microcomputer includes an analog-to-digital converter for converting said processed test signal into a digital processed test signal and supplying the digital processed test signal to said microcomputer.

4. The electronic device according to claim 3, further comprising a digital-to-analog converter for converting said test signal supplied by said microcomputer and supplying an analog test signal to said switch, wherein said switch receives said analog test signal and said input signal at said respective inputs and selectively supplies one of said analog test signal and said input signal to said processing circuit in response to said control signal received from said microcomputer.

* * * * *